March 29, 1960   H. M. SCHENDEL   2,931,002
SLIP RING MOUNT
Filed Nov. 12, 1957
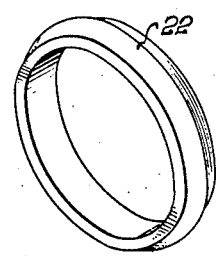
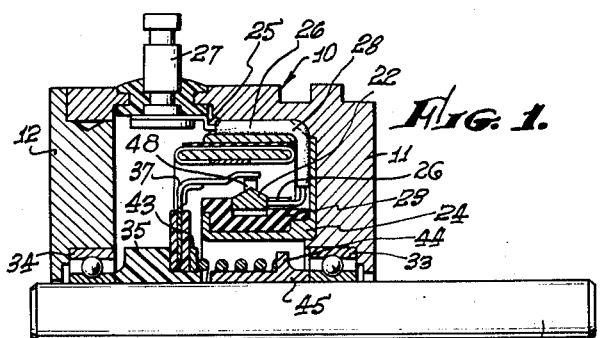
Herbert M. Schendel,
INVENTOR.
By His Attorneys.
Harris, Kiech, Foster & Harris.

United States Patent Office 2,931,002
Patented Mar. 29, 1960

2,931,002

SLIP RING MOUNT

Herbert Martin Schendel, Santa Ana, Calif., assignor to Beckman Instruments, Inc., a corporation of California Application November 12, 1957, Serial No. 695,639

7 Claims. (Cl. 338—167)

This invention relates to potentiometers or the like which have slip ring and a slip ring contact movable relative to each other for maintaining an electric circuit between the moving elements and, more particularly, to a mount for the slip ring.

In structures using slip rings, vibration and shock are sources of trouble, such mechanical vibration causing wiper discontinuities and contact resistance changes (electrical noise) which in turn create disturbances in electrical circuits of which the slip ring is a part. Many present-day applications require components to withstand shock and vibration with frequencies as high as two thousand cycles per second and accelerations up to forty G's.

It is an object of the invention to provide a vibration absorbing mount for a slip ring for use in a potentiometer or the like. A further object of the invention is to provide a unit for vibrational and electrical isolation of a slip ring which also serves as the mount for the slip ring. Another object of the invention is to provide such a slip ring mount which permits easy and quick installation and assembly of the slip ring into the potentiometer or other unit in which it is being used.

It is another object of the invention to provide a slip ring mount formed of an elastomer, i.e., an elastic material having rubber-like properties, which elastomer is positioned between the slip ring and the structure which carries the slip ring. A further object of the invention is to provide such a slip ring mount in which the elastomer is a silicone rubber which provides the desired electrical and vibrational isolation over a wide temperature range.

It is a further object of the invention to provide a slip ring mount for use in a potentiometer or the like which may be a molded elastomer and which may have a concentric groove for receiving and supporting a slip ring for motion of the mount and slip ring relative to a slip ring contact. A further object of the invention is to provide such a slip ring mount which may have a plurality of deformable ribs located in the groove with the slip ring resting on the ribs. Another object of the invention is to provide a potentiometer or the like in which a shaft is rotatable relative to a housing to provide rotation between a slip ring and a slip ring contact with the shaft being spring loaded toward one end of the housing to control axial vibration of the structure.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

Fig. 1 is a longitudinal sectional view of a preferred embodiment of the invention;

Fig. 2 is an end view of the structure of Fig. 1 with the rear lid removed;

Fig. 3 is an isometric view of the slip ring of Fig. 1;

Fig. 4 is an isometric view of the slip ring mount of Fig. 1; and

Figs. 5, 6, 7 and 8 are diagrammatic illustrations of alternative embodiments of the structure of Fig. 1.

The invention includes a vibration absorbing or vibration isolating mount positioned between the slip ring and the support therefor. This vibration isolating mount should be an elastic structure which may include one or more springs. A preferred form of the mount is shown in Figs. 1 through 4, where the slip ring mount is formed of a molded elastomer. An elastomer is an elastic material having rubber-like properties and in the embodiment illustrated herein, it is preferred to use a silicone rubber because of its superior high temperature qualities. When the slip ring mount of the invention is described herein in conjunction with a potentiometer, it is equally applicable to other units in which an electrical circuit is to be maintained between relatively moving parts.

The potentiometer of Fig. 1 includes a housing 10 with a rear lid 12 fastened to the housing by screws 13. An annular resistance element comprising a resistance wire 14 wound on a form 15 is mounted in a retainer 16 with an insulator 17 between the resistance element and the retainer. The ends of the resistance wire 14 are connected to terminals 18 and 19 respectively, the terminals being insulatedly mounted in the housing 10.

An annular slip ring 22 of electrical conducting material is mounted on a slip ring mount 23 which in turn is positioned on a hub 24. The hub 24 is concentrically positioned within the housing 10 and is held in place by engagement with the retainer 16. A conductor 25 passes through a notch 26 in the mount 23 and through a similar notch in the retainer 16, providing an electrical connection between the slip ring and a terminal 27. An insulating sleeve 28 is positioned about a portion of the conductor 25.

The mount 23 is a hollow cylinder or sleeve of an elastomer such as silicone rubber with the inner opening being a push fit on the hub 24. In this preferred form of the invention, an annular groove 29 is provided in the outer surface of the cylindrical mount to receive the slip ring 22 which may be positioned on the slip ring mount by temporarily deforming the mount. Such a slip ring mount serves as a vibration and shock absorber for the slip ring and also acts as an electrical insulator and a support for the slip ring. It is preferred to form a plurality of projecting ribs 30 in the groove 29 upon which the slip ring rests. The ribs will deform without requiring compression of the material of the mount, thereby providing improved shock and vibration isolation.

A rotatable shaft 32 is supported in bearings 33, 34 positioned in the housing 10 and lid 12, respectively. A hub 35 is fixed to the shaft with a set screw 36, a contact holder 37 being carried on the hub by insulating washers 38, 39.

A compression spring 42 is positioned about the shaft 32 between a washer 43 carried on the hub 35 and a shoulder 44 of a sleeve 45. The forward end of the sleeve 45 rests against the bearing 33 so that the compression spring urges the shaft toward the rear of the unit, motion of the shaft being limited by engagement of a shoulder 46 of the hub 35 with the inner race of the bearing 34. A flexible contact 47 is carried at one end of the contact holder 37 for engaging the resistance element and another flexible contact 48 is carried at the other end of the contact holder for engaging the slip ring. The compression spring about the shaft serves to eliminate shaft end play and thereby eliminate or reduce the effect of relative movement of the shaft and housing during vibration of the unit. Spring loading may be eliminated by removing the spring. This is advantageous especially where spring loading of the bearings is limited or impractical.

The slip ring mount of the invention substantially eliminates electrical noise due to vibration. In comparative tests made upon identical units as shown in Fig. 1, the unit having a slip ring mount of silicone rubber produced no electrical noise when vibrated at a constant acceleration of forty G's and a frequency sweep from 500–2,000–500 cycles per second. The direction of vibration was radial and normal to the contact. In the second unit a phenolic slip ring mount was substituted for the elastomer mount. This produced electrical noises over a range of 50–500 millivolts under the conditions described above.

In the embodiment of Figs. 1 through 4, the slip ring is mounted on the housing and the slip ring contact makes external contact with the slip ring in the radial shaft direction. In Figs. 5 through 8, other embodiments of the invention are shown. In the embodiment of Fig. 5, the slip ring 22 and slip ring mount 23 are carried on the shaft 32 and the slip ring contact, indicated by the arrow 51, is carried on the housing 10 and makes contact in the axial shaft direction. In the embodiment of Fig. 6, the slip ring and mount are carried on the housing and the slip ring contact is carried on the shaft, making internal contact with the slip ring in the radial shaft direction. In the embodiment of Fig. 7, contact is made in the axial shaft direction with the slip ring and mount carried on the housing and the slip ring contact carried on the shaft. In the embodiment of Fig. 8, the slip ring contact is carried on the housing and makes external contact with the slip ring in the radial shaft direction, the slip ring and mount being carried on the shaft.

Although exemplary embodiments of the invention have been disclosed and discussed, it will be understood that other applications of the invention are posible and that the embodiments disclosed may be subjected to various changes, modifications and substitutions without necessarily departing from the spirit of the invention.

I claim as my invention:

1. In a potentiometer having a resistance element mounted in a housing and a rotating shaft with a first contact for electrically contacting the resistance element, the combination of: an annular slip ring mount of nonconducting, elastomeric material mounted on the housing concentric with the shaft; a slip ring of highly electrical conducting material mounted on said slip ring mount concentric therewith; a second contact carried on the shaft for electrical engagement with said slip ring; a sleeve slidably mounted on the shaft with one end of said sleeve engageable with one end of the housing; and a compression spring positioned concentric with the shaft for engagement with said sleeve and shaft to urge the shaft and sleeve axially apart toward opposite ends of the housing.

2. In a potentiometer or the like having two sections rotatable relative to each other with a slip ring in one section and a slip ring contact in the other section, means for mounting the slip ring in the potentiometer, said means including an electrically non-conducting element having substantial elasticity for carrying the slip ring and absorbing vibration, said vibration absorbing element being mechanically fixed to the one section for rotation therewith.

3. In a potentiometer or the like, the combination of: a housing having a cylindrical opening for receiving an arcuate resistance element and having means for rotatably supporting a shaft concentric with the resistance element; a slip ring hub having an axial opening therethrough; means for fixing said hub within said housing concentric with the resistance element and with the shaft passing through said axial opening; a slip ring mount of cylindrical configuration for positioning on said hub, said mount comprising an elastomeric, electrically non-conducting material having an annular groove in the outer wall thereof; and an annular ring of electrically conducting material for positioning in said groove.

4. In a potentiometer, the combination of: a housing unit; a shaft unit rotatably mounted in said housing unit; a slip ring mount of nonconducting, elastomeric material carried on one of said units concentric with said shaft unit; a rigid slip ring of highly electrical conducting material positioned on said mount for electrical and vibrational isolation from said one unit; and a contact carried on the other of said units for engaging said slip ring as said shaft unit is rotated relative to said housing unit.

5. In a potentiometer, the combination of: a housing unit having a support hub therein; a shaft unit rotatably mounted in said housing unit coaxial with said hub; a slip ring mounting sleeve of nonconducting, elastic material of rubber-like properties carried on said hub, said sleeve having an annular groove in the outer wall thereof; a rigid slip ring of highly electrical conducting material positioned in said groove for electrical and vibrational isolation from said hub; and a contact carried on said shaft unit for engaging said slip ring as said shaft unit is rotated relative to said housing unit.

6. In a potentiometer, the combination of: a housing; a shaft rotatably mounted in said housing; a slip ring mount of elastomeric material carried in said housing concentric with said shaft, said mount having an annular groove in an outer wall thereof with a plurality of ribs extending radially outwardly from the base of said groove; a slip ring of electrical conducting material positioned in said groove in engagement with said ribs for electrical and vibrational isolation from said housing; and a contact carried on said shaft for engaging said slip ring as said shaft is rotated relative to said housing.

7. In a potentiometer, the combination of: a housing; a resistance element mounted in said housing; a shaft rotatably mounted in said housing; a first contact; means for mounting said first contact on said shaft and urging said first contact in a first direction into engagement with said resistance element; an annular slip ring mount of nonconducting, elastomeric material mounted on said housing concentric with said shaft; a slip ring of highly electrical conducting material mounted on said slip ring mount concentric therewith; a second contact carried on said shaft for electrical engagement with said slip ring; a sleeve slidably mounted on said shaft with one end of said sleeve engageable with one end of said housing; and a compression spring positioned concentric with said shaft for engagement with said sleeve and shaft to urge said shaft in a second direction opposite to said first direction.

References Cited in the file of this patent

UNITED STATES PATENTS

| 427,103 | Morgan | May 6, 1890 |
| 2,512,745 | Kebler | June 27, 1950 |
| 2,544,554 | Holmes | Mar. 6, 1951 |
| 2,668,218 | Searle | Feb. 2, 1954 |
| 2,799,756 | Graham | July 16, 1957 |
| 2,804,528 | Rapisarda | Aug. 27, 1957 |

FOREIGN PATENTS

| 377 | Great Britain | of 1867 |
| 93,124 | Germany | Mar. 20, 1896 |
| 416,894 | Italy | Dec. 18, 1946 |